May 17, 1960 — R. GAUTRON — 2,936,663
BEVEL CUTTING SHEARING MACHINES FOR METAL SHEETS
Filed July 10, 1956 — 4 Sheets-Sheet 1

May 17, 1960    R. GAUTRON    2,936,663
BEVEL CUTTING SHEARING MACHINES FOR METAL SHEETS
Filed July 10, 1956    4 Sheets-Sheet 2
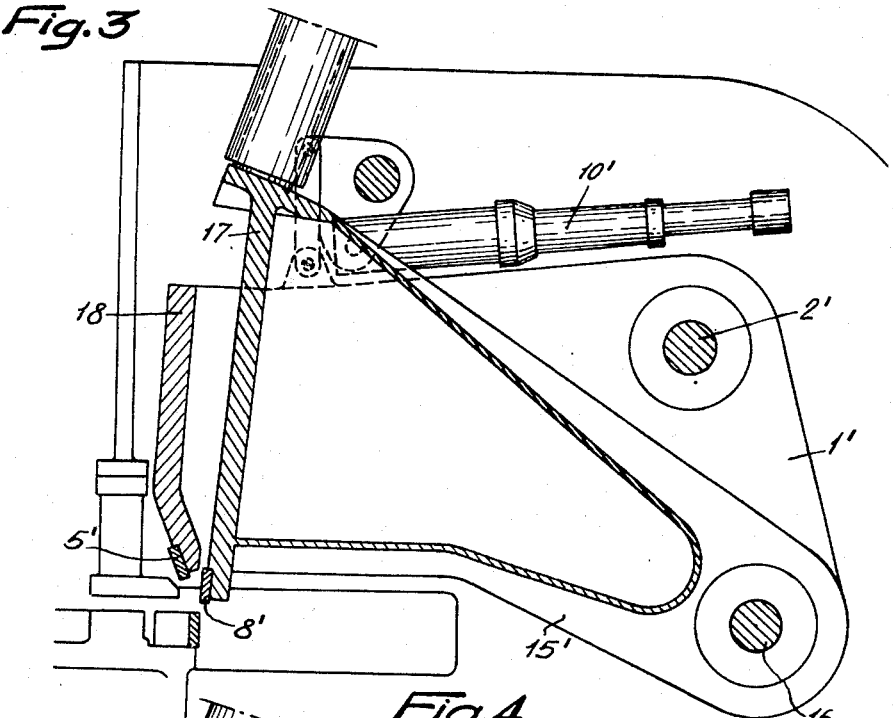
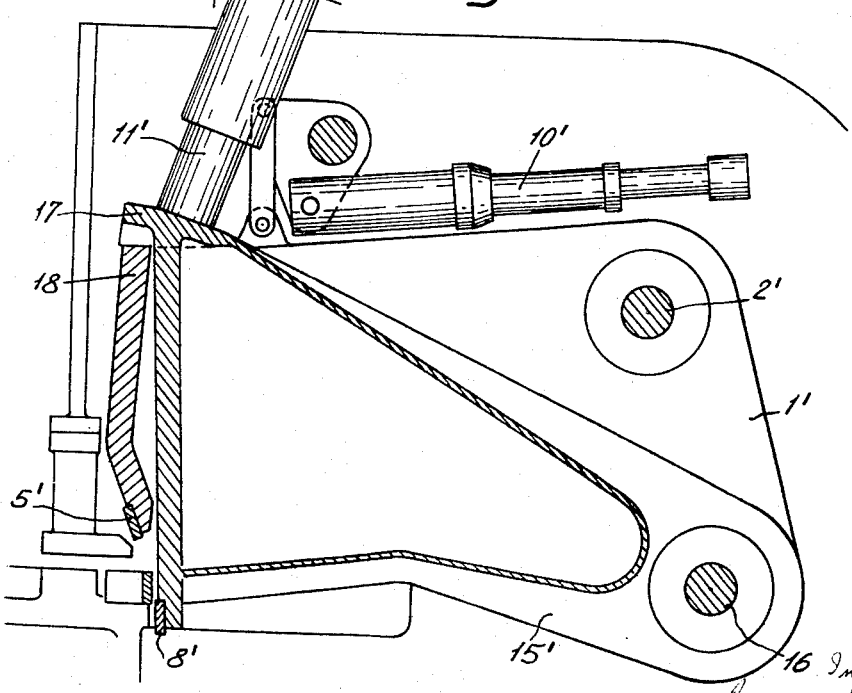
Inventor
Raymond Gautron May 17, 1960 R. GAUTRON 2,936,663
BEVEL CUTTING SHEARING MACHINES FOR METAL SHEETS
Filed July 10, 1956 4 Sheets-Sheet 3

May 17, 1960 R. GAUTRON 2,936,663
BEVEL CUTTING SHEARING MACHINES FOR METAL SHEETS
Filed July 10, 1956 4 Sheets-Sheet 4
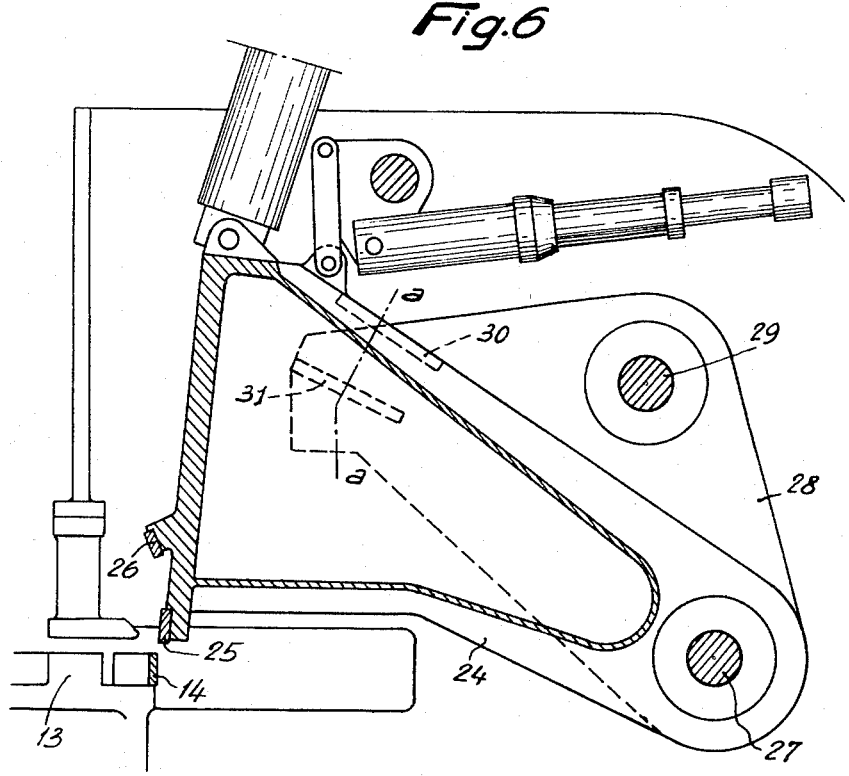
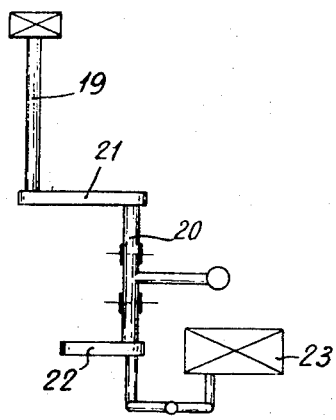
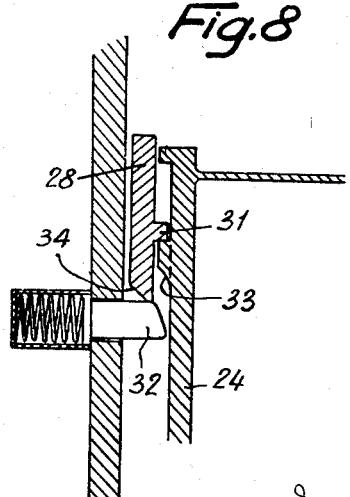

United States Patent Office 2,936,663
Patented May 17, 1960

2,936,663
BEVEL CUTTING SHEARING MACHINES FOR METAL SHEETS

Raymond Gautron, La Courneuve, France, assignor to Corpet, Louvet & Cie., La Courneuve, France, a corporation of France Application July 10, 1956, Serial No. 597,033

Claims priority, application France July 12, 1955

12 Claims. (Cl. 83—3)

It is often necessary to cut metal sheets at a certain angle of inclination to produce a bevel edge, especially if the sheets are intended to be butt-welded.

To avoid the difficult and troublesome task of jacking up the sheets on chocks under the moving blade of the shearing machine, it has been proposed to provide tilting tables for supporting the sheets or to arrange that the shearing blades can be inclined to cut the metal at the appropriate angle.

Nevertheless such machines suffer from a number of disadvantages.

In fact, the operation much be performed in two stages: The metal sheet must first be cut vertically and the vertical edge must then be bevel cut, because shearing machines fail to produce a satisfactory bevel edge at the first cut. Consequently, in shearing machines comprising an adjustably inclinable blade, the tilting mechanism of the blade must be operated after each vertical cut and the blade must be subsequently returned to the vertical position for each consecutive sheet. This entails considerable loss of time in dealing with each sheet, as the blade must be allowed to return to its raised position after each cut, its supporting structure must be tilted, and then locked in the desired position.

The alternative method of first vertically cutting a batch of sheets and then cutting the bevel edges on the entire batch likewise offers no advantage since it means passing each sheet twice through the machine and therefore twice handing and clamping each sheet on the table.

Machines with an inclinable table in practice suffer from similarly grave defects bacause the fixtures required for securing the sheets on the table are much less reliable when the cut is performed at an angle than when it is made perpendicularly across the sheet. Moreover, like machines with inclinable blades, they call for the duplication of all operations.

It is the object of the present invention to remedy these defects which are common to all mechanically, hydraulically, or otherwise operated shearing machines. The invention consists substantially in a shearing machine which comprises two blades, one for performing the vertical cut and the other for performing the bevel cut, the blades being operated in succession by the operating ram of the machine. Each sheet need therefore be clamped down only once for the vertical as well as the bevel cut.

In a preferred form of construction, the ram or other operating means actuates the vertically cutting blade which performs the vertical cut during the first part of the stroke at the end of which the support of the vertically cutting blade entrains the support of the bevel cutting blade in such a manner that the bevel cut is performed during the second part of the stroke.

Other features and advantages of the shearing machine according to the invention will be explained and the invention more particularly described with reference to three illustrative embodiments shown in the accompanying drawings, in which:

Fig. 3 is a sectional side elevation of another form of construction;

Figs. 4 and 5 show the shearing machine according to Fig. 3 at the end of the first part of the working stroke and at the end of the complete stroke, respectively;

Fig. 6 is a sectional side elevation of yet another form of construction;

Fig. 7 is a detailed view of the intercepting and interlocking mechanism; and

Fig. 8 is a cross-sectional view taken substantially on line a—a of Fig. 6.

Figure 1:
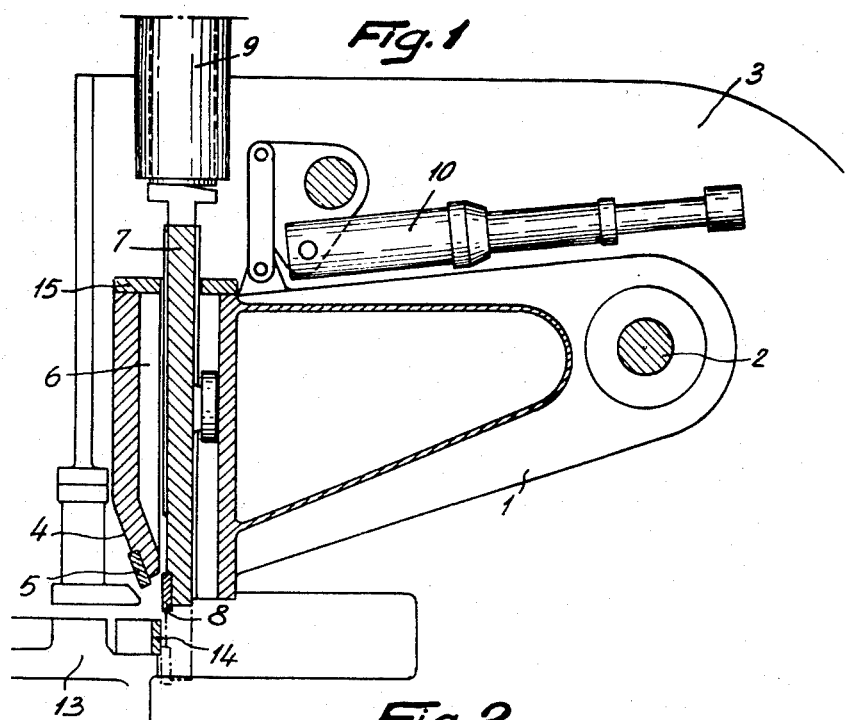
Fig. 1 is a sectional side elevation of one form of construction of the machine.
Figure 2:
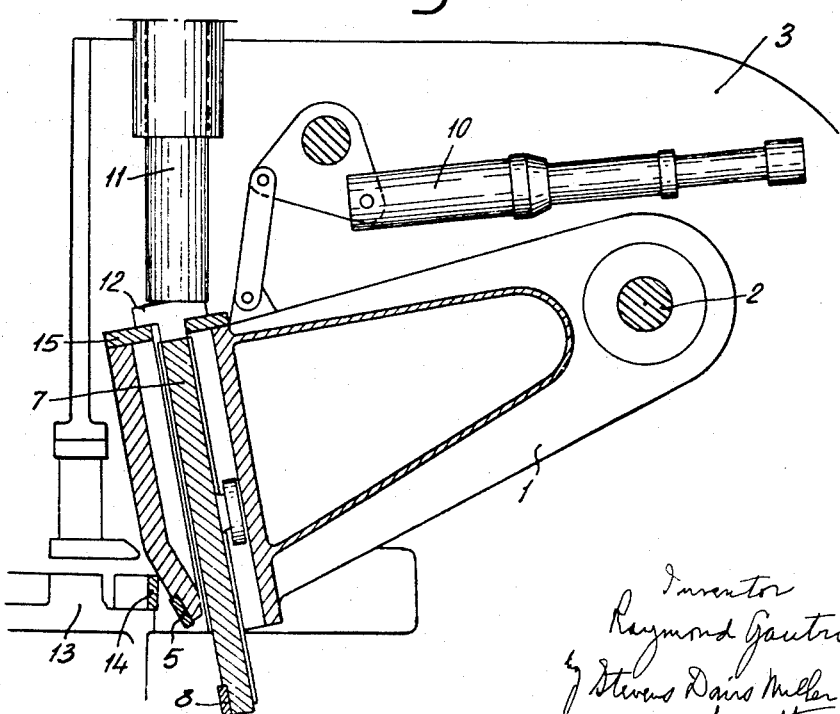
Fig. 2 is the shearing machine illustrated in Fig. 1 shown at the end of the complete working stroke.

In the form of construction shown in Figs. 1 and 2, the movable blades are supported in a rocking cradle 1 fulcrumed at 2 between the side walls 3 of the frame of the machine. This cradle carries, on an inclined face 4 of a vertical member connecting the two shanks of the cradle, a blade adapted to produce the bevel cut.

The cradle is further provided with a slideway 6 for a sliding block 7 which carries a blade 8 adapted to produce the vertical cut.

There is also provided an actuating cylinder 9 which imparts the working stroke to the blades, as well as airhydraulic retracting means 10. When the ram 11 descends from the cylinder 9, it depresses the head 12 of the sliding block which is normally maintained in the raised position by draw-back means not specially shown in the drawing. As the sliding block is forced downwards, the blade 8 cuts vertically through the metal sheet located on a table 13 which is fitted with a cooperating fixed blade 14. As soon as the vertical cut has been made the head of the sliding blocks 7 comes into contact with the head of a member 15 extending between the arms of the cradle 1, and forces the blade 5 downwards which at the same time performs a pivoting motion about the fulcrum at 2 against the counterpressure of the retracting device 10.

When the slanting cut has been completed the ram ascends, the shanks of the cradle and the sliding block resuming their initial positions under the action of the draw-back means.

Figure 5:
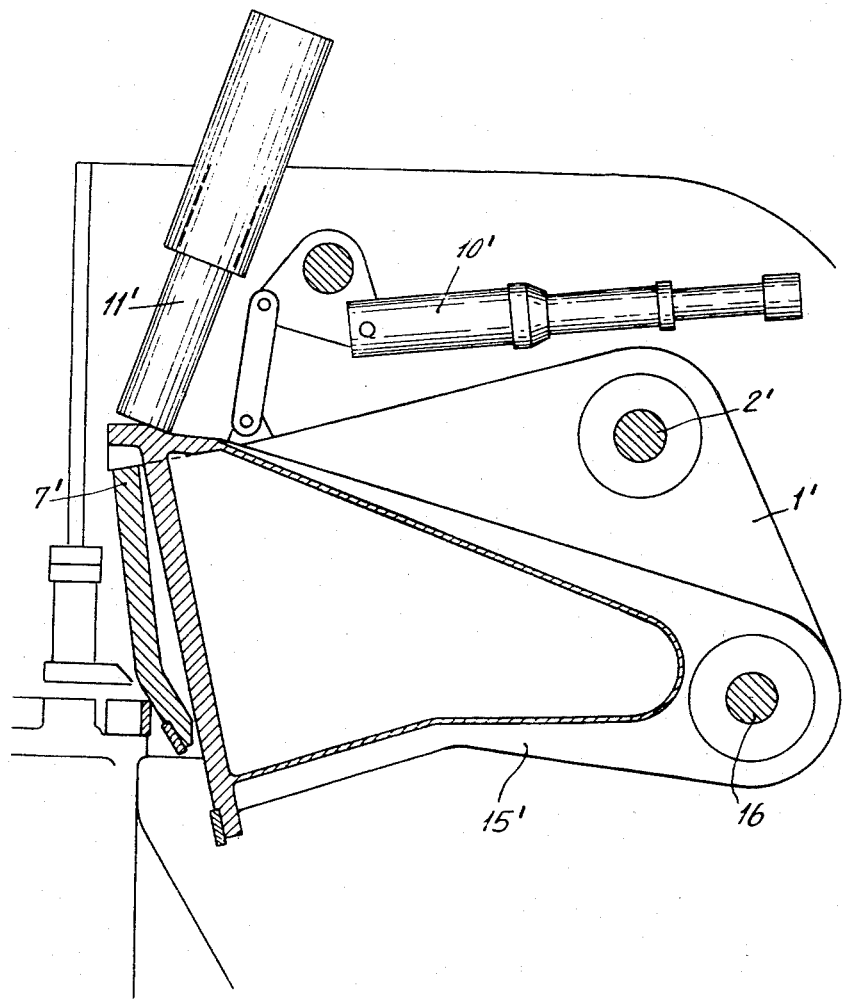

In an alternative form of construction illustrated in Figs. 3, 4 and 5, the vertical blade 8', instead of being affixed to a vertically and linearly displaceable sliding block is mounted on a rocking cradle 15', the shanks of which are fulcrumed at 16 on the body of a second cradle 1' which carries the blade 5' of the slanting cut.

In this form of construction, the ram 11' cooperates with a member 17 extending between the shanks of the cradle 15' and first depresses only the vertically cutting blade 8' which descends in a wide circular arc about the fulcrum at 16. As soon as the vertical member 17 comes into contact with the upper edge of the member 18 (Fig. 4), the second blade 5' is entrained and the entire assembly is tilted about the fulcrum at 2' from which cradle 1' is pivotally suspended. At the end of the stroke of the ram the retracting device 10' restores the entire assembly to its former position.

Whilst the vertically cutting blade is in operation, the rocking cradle which carries the slanting blade is retained in the inactive raised position by a suitable locking mechanism.

It is naturally possible to stop the ram after the completion of only part of its stroke in such a way that only the vertical blade is brought into action. To this end the mechanism may be provided with a contact finger 19 which is rigidly affixed to the support of the vertical blade and which at the appropriate point of the stroke comes into contact with one of two arms 21, 22 of different length and angular position of a twin lever which is adapted to close a valve in the supply system to the ram (Fig. 7).

By angularly turning the lever either the one or the other of the two arms can be brought into position to intercept the contact finger during the working stroke of the ram so as to curtail the length of the stroke to the performance of only the vertical cut or to permit the completion of the stroke for the performance of the bevel cut.

Thus, with regard to Figure 7, it is to be understood that the finger 19, which is rigidly connected with the support for the straight cutting blade, moves straight downwardly. As shown in Figure 7, the arm 21 is in the path of downward movement of the finger 19 so that it limits its downward stroke whereby the operation is limited to the carrying out of a straight cut.

The arms 21 and 22, as can be seen from Figure 7, extend laterally outwardly from the vertical rod 20 and are in relative angular relationship. The rod 20 is pivotally mounted, as schematically suggested by Figure 7, in order to selectively dispose either the arm 21 or the arm 22 in the path of the finger 19. The handle (not numbered) on the rod 20 controls the rotation thereof and can move the rod to dispose the arm 22 in the path of downward movement of the finger 19. Thus, the handle can turn the rod 20 in order to place the arm 21 in the path of the finger 19; in which instance, the stroke is limited so that only a straight cut is made. The handle can turn the rod 20 to dispose the arm 21 out of the path of the finger 19 and position the arm 22 in the downward path of movmnt of the finger 19; in which latter instance, the stroke of the finger permits the straight cut followed by the bevel cut.

Between the rod 20 and the distributor 23 is a system of levers (unnumbered) which control the distributor which feeds the jack, such as 9.

In a third form of construction (Fig. 6), a rocking cradle 24 carries two blades 25 and 26, the former effecting the vertical cut and the latter for the bevel cut. The cradle 24 swings about a fulcrum 27 on a rocking member 28 which is pivotally supported by means of a pivot pin 29 from the supporting structure of the machine.

During the first part of the stroke of the ram, the cradle 24 pivots about its fulcrum at 27 and the blade 25 effects the vertical cut. At the end of this first part of the stroke, a projection 30 on the cradle 24 engages a corresponding porjection 31 on the rocker 28 (Fig. 8). In the second part of the stroke, the cradle 24 together with the rocker 28 pivots about the pin 29 and the blade 26 performs the bevel cut. In the course of the rocking movement of the cradle 24 about its fulcrum at 27 a stop member 32 prevents the rocker 28 from rocking on the pin 29 (Fig. 8).

When the cradle 24 reaches the end of its angular movement about its fulcrum at 27, a ramp 33 depresses the stop 32 sufficiently to allow a ramp 34 on the rocker 28 to depress it completely.

According to the invention, a simple and convenient mechanism controlled by a handle can be provided to set the machine optionally for effecting either a vertical or a bevel cut in the manner illustrated by the exemplary forms of construction that have been described.

I claim:

1. In a shearing machine for bevel cutting metal sheets; a frame, a first movable blade for performing a vertical cut, a second movable blade for performing a bevel cut, a rocking cradle fulcrumed on the frame, means for supporting at least the first movable blade for limited motion on this rocking cradle, and actuating means to produce a motion of the supporting means relative to the cradle during which the first blade cuts the sheet, followed by a motion of the supporting means and the rocking cradle in unison, one of them supporting the second blade, whereby the latter blade performs the bevel cut immediately after the vertical cut.

2. A shearing machine as claimed in claim 1, in which locking means are provided to maintain the rocking cradle stationary during the movement of the supporting means.

3. A shearing machine as claimed in claim 2, in which retracting means are provided for restoring the entire assembly to the initial position after the operation of the actuating means.

4. A shearing machine as claimed in claim 2, in which the actuating means act also as retracting means.

5. A shearing means as claimed in claim 1, in which the actuating means is a hydraulic jack.

6. A shearing machine as claimed in claim 1, characterised in that the vertically cutting blade is affixed to a sliding block adapted to perform a vertical linear movement in slideways forming part of the cradle to which the bevel cutting blade is affixed.

7. A shearing machine as claimed in claim 1, characterised in that the vertically cutting blade is affixed to a second cradle pivotally supported by the first mentioned cradle.

8. A shearing machine as claimed in claim 1, characterised in that the cradle to which the bevel cutting blade is attached is provided with a member which is entrained by the support of the vertically cutting blade when the latter has completed the vertical cut at the end of the first part of the stroke of the actuating means.

9. A shearing machine as claimed in claim 1, characterised in that means is provided for limiting the stroke of the actuating means so as to operate only the vertically cutting blade.

10. A shearing machine as claimed in claim 1, characterised in that a control mechanism is adapted by means of a simple handle to determine the motion of the machine to perform either a vertical cut or a vertical and bevel cut.

11. A shearing machine as claimed in claim 1, characterised in that the two blades are affixed to the same rocking cradle which is pivotally attached to the frame of the machine and remains stationary during the performance of the vertical cut and then rocks about the pins by means of which it is attached to the machine frame.

12. In a shearing machine for bevel cutting metal sheets, a frame, a first movable blade for performing a vertical cut, a second movable blade for performing a bevel cut, a rocking cradle fulcrumed on the frame, means for supporting the first movable blade and the second movable blade for limited rocking motion on the rocking cradle and means for actuating the blade supporting means to produce a limited motion of the blade supporting means relative to the cradle during which the first blade forms the vertical cut in the sheet followed by a movement of the blade supporting means and the cradle in unison during which the second blade performs the bevel cut.

References Cited in the file of this patent

UNITED STATES PATENTS

| 305,709 | Parry et al. | Sept. 23, 1884 |
| 593,778 | O'Neill | Nov. 16, 1897 |
| 838,675 | White | Dec. 18, 1906 |
| 867,884 | Jones | Oct. 8, 1907 |
| 1,814,366 | Carson | July 14, 1931 |
| 2,250,931 | Grieder | July 29, 1941 |

FOREIGN PATENTS

| 832,487 | Germany | Feb. 25, 1952 |